(12) United States Patent
Chu

(10) Patent No.: US 9,276,464 B2
(45) Date of Patent: Mar. 1, 2016

(54) VOLTAGE GENERATION CIRCUIT USING SINGLE AND DOUBLE REGULATION MODES

(71) Applicant: SK hynix Inc., Icheon-si (KR)

(72) Inventor: Gyo-Soo Chu, Icheon-si (KR)

(73) Assignee: SK HYNIX INC., Icheon (KR)

( * ) Notice: Subject to any disclaimer, the term of this patent is extended or adjusted under 35 U.S.C. 154(b) by 373 days.

(21) Appl. No.: 13/846,582

(22) Filed: Mar. 18, 2013

(65) Prior Publication Data

US 2014/0167719 A1     Jun. 19, 2014

(30) Foreign Application Priority Data

Dec. 14, 2012   (KR) .................. 10-2012-0146320

(51) Int. Cl.
*H02M 3/07* (2006.01)
*H02M 1/00* (2007.01)

(52) U.S. Cl.
CPC ........ *H02M 3/07* (2013.01); *H02M 2001/0045* (2013.01)

(58) Field of Classification Search
CPC   H02M 3/07; H02M 3/077; H02M 2001/0045
USPC ........................................................ 327/536
See application file for complete search history.

(56) References Cited

U.S. PATENT DOCUMENTS

| 6,160,440 | A | 12/2000 | Javanifard et al. |
| 7,436,228 | B1 * | 10/2008 | Hoang .................... H03L 7/087 327/152 |
| 7,936,154 | B2 | 5/2011 | Lee |
| 8,633,759 | B2 * | 1/2014 | Sung ...................... H02M 3/07 327/536 |
| 2005/0030771 | A1 * | 2/2005 | Conte ................... H02M 3/073 363/59 |
| 2005/0073355 | A1 * | 4/2005 | Sivero et al. .................. 327/536 |
| 2005/0189983 | A1 | 9/2005 | Sivero et al. |
| 2005/0258810 | A1 * | 11/2005 | Lin ............... 323/282 |
| 2009/0027110 | A1 * | 1/2009 | Lee ............... 327/538 |
| 2009/0184697 | A1 | 7/2009 | Park |
| 2012/0218817 | A1 * | 8/2012 | Kang ................. G11C 11/5628 365/185.2 |
| 2013/0063118 | A1 * | 3/2013 | Nguyen ................ G11C 5/145 323/304 |

FOREIGN PATENT DOCUMENTS

| CN | 1848635 A | 10/2006 |
| CN | 1882895 A | 12/2006 |
| CN | 101364118 A | 2/2009 |
| KR | 10-1027700 B1 | 4/2011 |

OTHER PUBLICATIONS

Office Action from Chinese Patent Office for Chinese Application No. 201310652299.4, dated Dec. 16, 2015.

* cited by examiner

*Primary Examiner* — Jue Zhang
*Assistant Examiner* — Lakaisha Jackson

(57) ABSTRACT

A voltage generation circuit is provided, which includes a pumping unit generating a high voltage and a voltage regulation unit controlling the pumping unit to generate a target voltage in a first mode and controlling the pumping unit to generate a reserve voltage and generating the target voltage through down conversion of the reserve voltage in a second mode.

9 Claims, 7 Drawing Sheets

VOLTAGE GENERATION CIRCUIT USING SINGLE AND DOUBLE REGULATION MODES

CROSS-REFERENCE TO RELATED APPLICATIONS

The present application claims priority to Korean Patent Application No. 10-2012-0146320, filed on Dec. 14, 2012, which is incorporated herein by reference in its entirety.

BACKGROUND

1. Field

Exemplary embodiments of the present invention relate to a voltage generation circuit which generates a high-level voltage through boosting of an input voltage.

2. Description of the Related Art

A semiconductor device includes internal circuits operating with voltages that are supplied from an external power source. However, since operating voltages having various levels are used in the semiconductor device, it is difficult for the external power source to supply all the operating voltages that are used in the internal circuits of the semiconductor device. Accordingly, a semiconductor device includes voltage generation circuits to internally generate operating voltages having different levels.

Particularly, in a device that uses a battery as an external power source, if a level of a power supply voltage supplied from the battery is lower than levels of voltages required to operate internal circuits in the device, it is necessary to internally generate the required voltages whose levels are higher than the power supply voltage supplied from the battery. In order to generate a high-level voltage that is higher than the power supply voltage from the external power source, a charge pump circuit may be used. A method for generating a high-level voltage using the charge pump circuit may include (1) a single-regulation method which directly generates a target voltage through the charge pumping, and (2) a double-regulation method which generates a higher voltage than a target voltage through the charge pumping and then generates the target voltage through regulation of the higher voltage. The single-regulation method may reduce current consumption in generating the target voltage, but may generate voltage ripples in the target voltage. On the other hand, while the double-regulation method may generate a stabilized target voltage, it may increase the current consumption in generating the target voltage.

Accordingly, in generating a higher voltage than an external power supply voltage, there is a need for developing a method that can stabilize a level of the higher voltage and reduce the current consumption, compared to the single-regulation method and the double-regulation method.

SUMMARY

Various embodiments are directed to a voltage generation circuit which can perform both a single-regulation method and a double-regulation method and thus take advantage of, and reduce the disadvantages of, the two methods.

In an embodiment, a voltage generation circuit includes a pumping unit configured to generate a higher voltage than a voltage inputted from an external power source and a voltage regulation unit configured to control the pumping unit to generate a target voltage in a first mode and control the pumping unit to generate a reserve voltage and generate the target voltage through down conversion of the reserve voltage in a second mode.

In an embodiment, a voltage generation circuit includes a pumping unit configured to pump a voltage of a pumping terminal in response to an activation signal; a first voltage division unit configured to generate a first feedback voltage through division of the voltage of the pumping terminal; a second voltage division unit configured to generate a second feedback voltage through division of the voltage of the pumping terminal in a first mode, and generate the second feedback voltage through division of the voltage of an output node in a second mode; an activation signal generation unit configured to generate the activation signal through comparison of the second feedback voltage with a reference voltage in the first mode, and generate the activation signal through comparison of the first feedback voltage with the reference voltage in the second mode; a control signal generation unit configured to generate a control signal through comparison of the second feedback voltage with the reference voltage in the second mode; and an output voltage adjustment unit configured to down-convert the voltage of the pumping terminal and supply the down-converted voltage to the output node in response to the control signal.

In an embodiment, a voltage generation circuit includes a first pumping unit; a second pumping unit; a switch configured to electrically disconnect and connect a first pumping terminal and a second pumping terminal in a first mode and a second mode, respectively; and a voltage regulation unit configured to control the first pumping unit and the second pumping unit to generate a first target voltage and a second target voltage, respectively, in the first mode, and control the first pumping unit and the second pumping unit to generate reserve voltages and generate the first target voltage and the second target voltage through down conversion of the reserve voltages in the second mode.

In an embodiment, a voltage generation circuit includes a first pumping unit configured to pump a voltage of a first pumping terminal in response to a first activation signal; a first voltage division unit configured to generate a first feedback voltage through division of the voltage of the first pumping terminal; a second voltage division unit configured to generate a second feedback voltage through division of the voltage of the first pumping terminal in a first mode, and generate the second feedback voltage through division of the voltage of a first output node in a second mode; a first activation signal generation unit configured to generate the first activation signal through comparison of the second feedback voltage with a first reference voltage in the first mode, and generate the first activation signal through comparison of the first feedback voltage with the first reference voltage in the second mode; a first control signal generation unit configured to generate a first control signal through comparison of the second feedback voltage with the first reference voltage in the second mode; a first output voltage adjustment unit configured to down-convert the voltage on the first pumping terminal and supply the down-converted voltage to the first output node in response to the first control signal in the second mode; a second pumping unit configured to pump a voltage of a second pumping terminal in response to a second activation signal in the first mode, and pump a voltage of the second pumping terminal in response to the first activation signal in the second mode; a switch configured to electrically connect the first pumping terminal and the second pumping terminal in the second mode; a third voltage division unit configured to generate a third feedback voltage through division of the voltage of the second pumping terminal in the first mode, and generate the third feedback voltage through division of a voltage on a second output node in the second mode; a second activation signal generation unit configured to generate the second activation signal through comparison of the third feedback voltage with a second reference voltage in the first mode; a second control signal generation unit configured to generate a second control signal through comparison of the third feedback voltage with the second reference voltage in the second mode; and a second output voltage adjustment unit configured to down-convert the voltage on the second pumping terminal and supply the down-converted voltage to the second output node in response to the second control signal in the second mode.

According to the voltage generation circuit according to embodiments of the present invention, since both the single-regulation method and the double-regulation method can be performed by the same voltage generation circuit, advantages of each of the two methods can be combined while the disadvantages can be reduced. Further, the two methods may be implemented without increasing an area of the voltage generation circuit.

Further, when two output voltages are generated, one voltage output generated using the single-regulation method and the other voltage may be generated using the double-regulation method.

DETAILED DESCRIPTION

Figure 1:
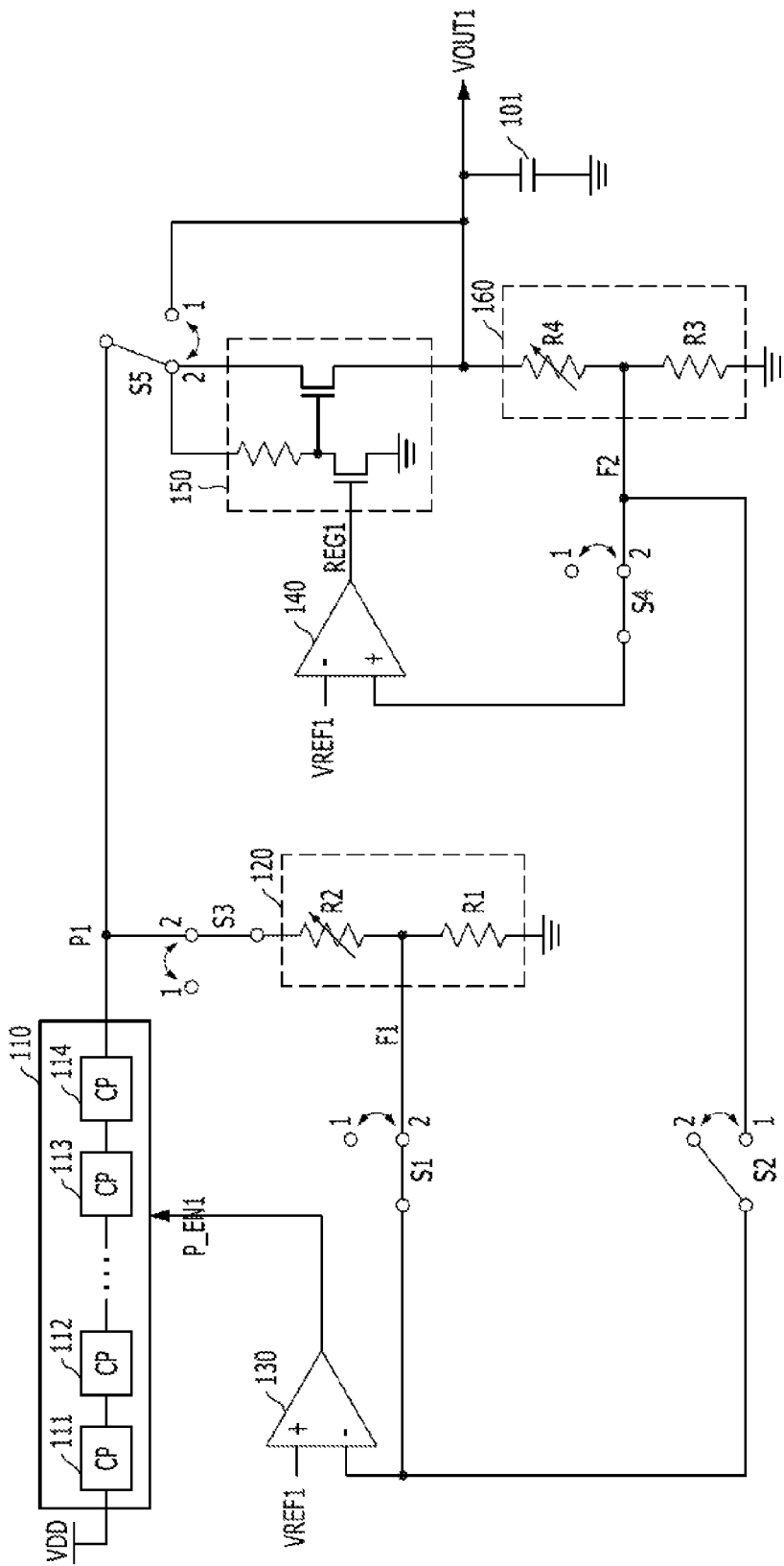
FIG. 1 is a diagram illustrating a configuration of a voltage generation circuit in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a diagram illustrating a configuration of a voltage generation circuit in accordance with an embodiment of the present invention.

Referring to FIG. 1, the voltage generation circuit includes a pumping unit 110, switches S1 to S5, a first voltage division unit 120, an activation signal generation unit 130, a control signal generation unit 140, an output voltage adjustment unit 150, a second voltage division unit 160, and a capacitor 101.

In an embodiment, the pumping unit 110 includes a plurality of charge pumps 111 to 114 which are coupled in series. The charge pump 111 generates an output voltage that is higher than a power supply voltage VDD, and the next charge pump 112 generates a higher output voltage than the output voltage of the charge pump 111. An output voltage of the last charge pump 114 is supplied to a first pumping terminal P1 of the pumping unit 110. The pumping unit 110 may be activated or inactivated in response to a first activation signal P_EN1.

The first voltage division unit 120, the activation signal generation unit 130, the control signal generation unit 140, the output voltage adjustment unit 150, and the second voltage division unit 160 are selectively coupled to each other to constitute a voltage regulation unit corresponding to a set mode of the voltage generation circuit. For instance, if the voltage generation circuit is set to a first mode, the voltage regulation unit includes the activation signal generation unit 130 and the second voltage division unit 160 and controls the pumping unit 110 so that the pumping unit 110 directly outputs a target voltage. That is, the voltage of the first pumping terminal P1 becomes the target voltage. If the voltage generation circuit is set to a second mode, the voltage regulation unit includes the first voltage division unit 120, the activation signal generation unit 130, the control signal generation unit 140, the output voltage adjustment unit 150, and the second voltage division unit 160. The voltage regulation unit in the second mode controls the pumping unit 110 so that the pumping unit 110 generates a reserve voltage, which is used to generate the target voltage through down conversion of the reserve voltage. As described above, the voltage regulation unit is configured to have different configurations in accordance with the first and second modes, respectively, based on operations of the switches S1 to S5.

In the first mode and the second mode, the voltage generation circuit operates to implement a single-regulation method and a double-regulation method, respectively. The operations of the switches S1 to S5 are performed depending on the set mode, i.e., the first mode or the second mode. Table 1 below shows operational states of the switches S1 to S5 in accordance with the set mode.

TABLE 1

| Switch | First Mode | Second Mode |
| --- | --- | --- |
| S1 | First State | Second State |
| S2 | First State | Second State |
| S3 | First State | Second State |
| S4 | First State | Second State |
| S5 | First State | Second State |

Since the control of the switches S1 to S5 to be in the first state or in the second state, in accordance with the set mode, is apparent to those of ordinary skill in the art to which the present invention pertains, detailed description thereof will be omitted. Now, referring to FIGS. 2 and 3, an operation of the voltage generation circuit in accordance with the respective mode will be described.

Figure 2:
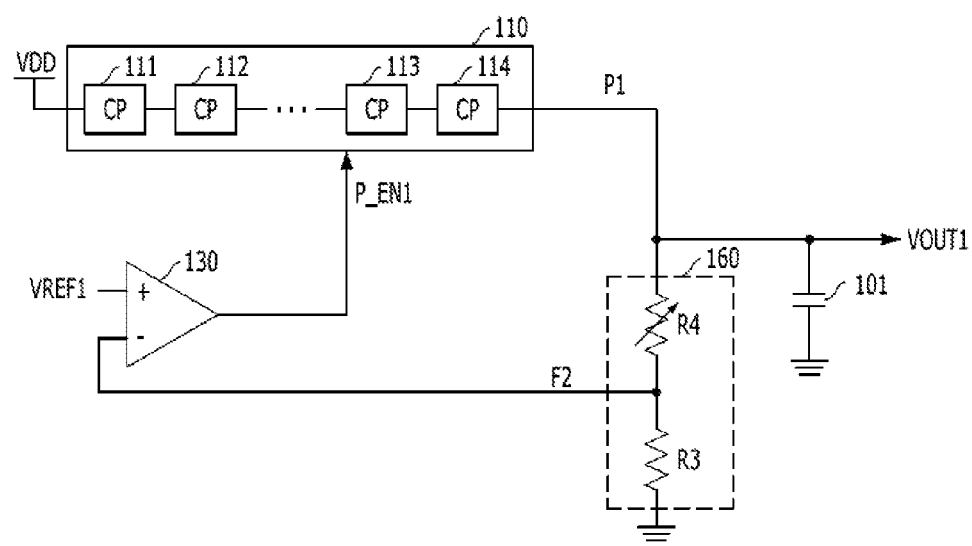
FIG. 2 is a diagram illustrating operating elements when the voltage generation circuit of FIG. 1 is set to a first mode.

FIG. 2 is a diagram illustrating operating elements when the voltage generation circuit of FIG. 1 is set to the first mode.

Referring to FIG. 2, the first voltage division unit 120, the control signal generation unit 140, and the output voltage adjustment unit 150 are not shown. This is because the switches S1 to S5 shown in FIG. 1 are in the first state 1 in the first mode, and thus the first voltage division unit 120, the control signal generation unit 140, and the output voltage adjustment unit 150 do not operate. The first pumping terminal P1 and a first output node VOUT1 of the voltage generation circuit are directly connected to each other through the switch S5 in the first state 1 so that they become the same node.

Figure 3:
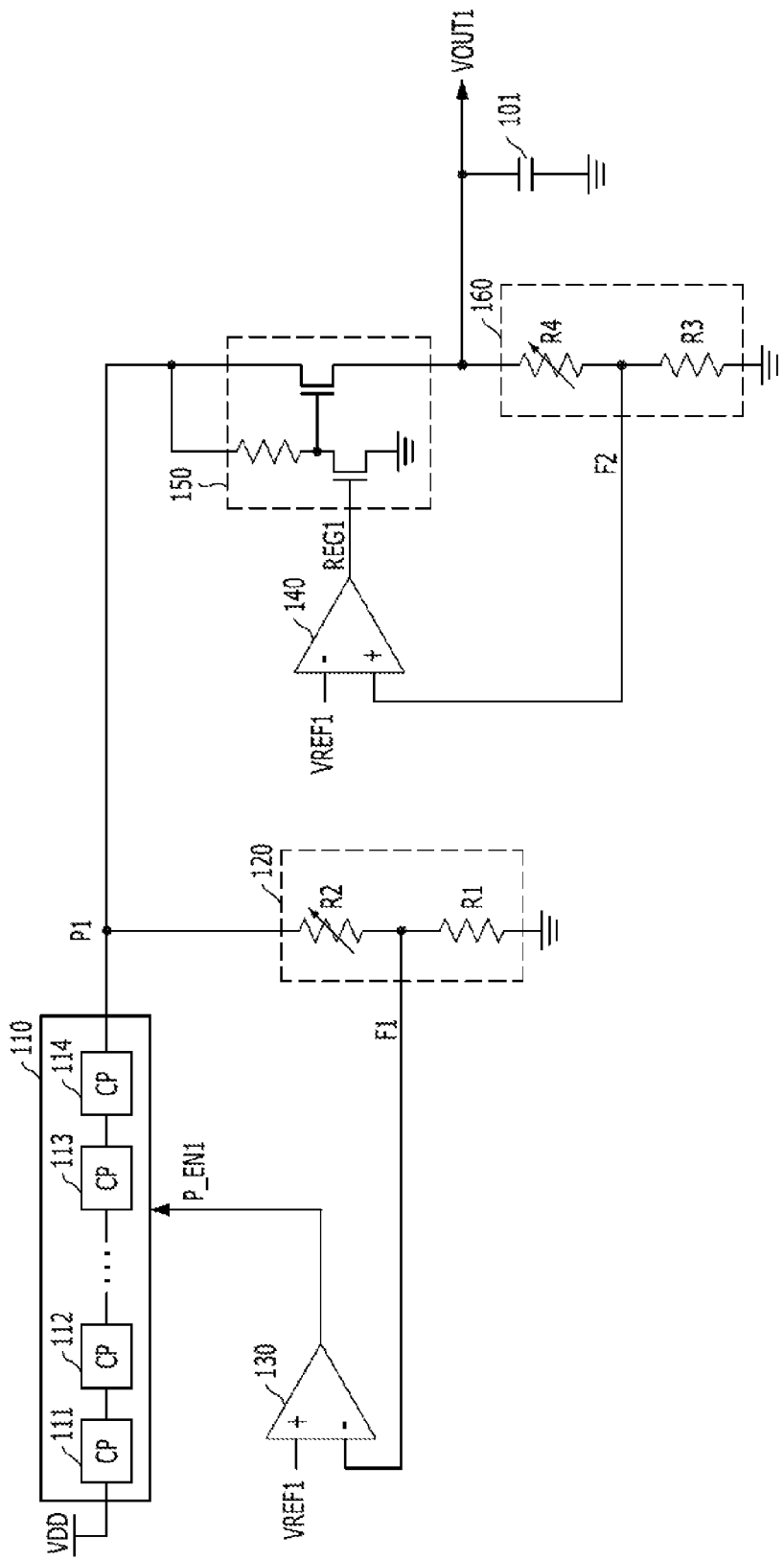
FIG. 3 is a diagram illustrating operating elements when the voltage generation circuit of FIG. 1 is set to a second mode.

In the first mode, the second voltage division unit 160 generates a second feedback voltage F2 by dividing the voltage of the first output node VOUT1 using resistors R3 and R4. Then, the activation signal generation unit 130 generates the first activation signal P_EN1 through comparison of a first reference voltage VREF1 with the second feedback voltage F2. Specifically, if the second feedback voltage F2 is lower than the first reference voltage VREF1, the activation signal generation unit 130 outputs the first activation signal P_EN1 to activate a pumping operation of the pumping unit 110, so that the pumping unit 110 increases a level of the voltage of the first output node VOUT1, and a level of the second feedback voltage F2 increases accordingly. On the other hand, if the second feedback voltage F2 is higher than the first reference voltage VREF1, the activation signal generation unit 130 outputs the first activation signal P_EN1 to deactivate the pumping operation of the pumping unit 110, so that the level of the voltage of the first output node VOUT1 decreases, and the level of the second feedback voltage F2 decreases accordingly. In this manner, the activation signal generation unit 130 controls the pumping unit 110 until the second feedback voltage F2 has substantially the same voltage level as the first reference voltage VREF1. As a result, the voltage of the first output node VOUT1 becomes approximately equal to VREF1*{(R3+R4)/R3}, which is the target voltage of the voltage generation circuit. Therefore, the level of the target voltage can be changed by adjusting a resistance value of the variable resistor R4. The capacitor 101 is used to keep the level of the first output node VOUT1 constant without voltage ripples. FIG. 3 is a diagram illustrating operating elements when the voltage generation circuit of FIG. 1 is set to the second mode.

Referring to FIG. 3, in the second mode, since the switches S1 to S5 in FIG. 1 are in the second state 2, all the elements of the voltage generation circuit shown in FIG. 1 operate, and the first pumping terminal P1 and the first output node VOUT1 are not directly connected to each other.

In the second mode, the first voltage division unit 120 generates a first feedback voltage F1 by dividing the voltage of the first pumping terminal P1 using resistors R1 and R2 of the first voltage division unit 120. Then, the activation signal generation unit 130 generates the first activation signal P_EN1 through comparison of the first reference voltage VREF1 with the first feedback voltage F1. Specifically, if the first feedback voltage F1 is lower than the first reference voltage VREF1, the activation signal generation unit 130 outputs the first activation signal P_EN1 to activate the operation of the pumping unit 110, so that the pumping unit 110 can increase the level of the voltage of the first pumping terminal P1. If the first feedback voltage F1 is higher than the first reference voltage VREF1, the activation signal generation unit 130 outputs the first activation signal P_EN1 to deactivate the pumping operation of the pumping unit 110, so that the level of the voltage of the first pumping terminal P1 decreases. In this manner, the activation signal generation unit 130 controls the pumping unit 110 until the first feedback voltage F1 is substantially the same level as the first reference voltage VREF1. As a result, the voltage of the first pumping terminal P1 becomes approximately equal to VREF1*{(R1+R2)/R1}. The voltage level of the first pumping terminal P1 can be changed by adjusting a resistance value of the variable resistor R2.

In the second mode, the second voltage division unit 160 generates the second feedback voltage F2 by dividing the voltage of the first output node VOUT1 using the resistors R3 and R4 of the second voltage division unit 160. The control signal generation unit 140 generates a first control signal REG1 through comparison of the first reference voltage VREF1 with the second feedback voltage F2. In an embodiment, if the second feedback voltage F2 is lower or higher than the first reference voltage VREF1, the control signal generation unit 140 outputs the first control signal REG1 at a "low" or "high" level, respectively. The output voltage adjustment unit 150 adjusts the voltage level of the first output node VOUT1 through down conversion of the voltage of the first pumping terminal P1 in response to the first control signal REG1. More specifically, if the first control signal REG1 is at the "low" level, the output voltage adjustment unit 150 increases the voltage level of the first output node VOUT1, and thus the second feedback voltage F2 increases. On the other hand, if the first control signal REG1 is at the "high" level, the output voltage adjustment unit 150 decreases the voltage level of the first output node VOUT1, and thus the second feedback voltage F2 decreases. In this manner, the output voltage adjustment unit 150 adjusts the level of the second feedback voltage F2 until the second feedback voltage F2 becomes approximately equal to the first reference voltage VREF1. As a result, the voltage level of the first output node VOUT1 becomes approximately equal to VREF1*{(R3+R4)/R3}. In this embodiment, because the voltage of the first output node VOUT1 is generated through the down conversion of the voltage of the first pumping terminal P1, the voltage of the first output node VOUT1 is smaller than the voltage of the first pumping terminal P1. Accordingly, the values of the resistors R1 to R4 should be determined to satisfy the condition of the voltage of the first pumping terminal P1 being higher than the voltage of the first output node VOUT1.

The voltage level of the first output node VOUT1 generated in the first mode may be substantially the same as the voltage level of the first output node VOUT1 generated in the second mode, which means that the voltage generation circuits of FIG. 2 and FIG. 3 may generate substantially the same level of output voltages regardless of whether the voltage generation circuit operates in the first mode or in the second mode.

Figure 4:
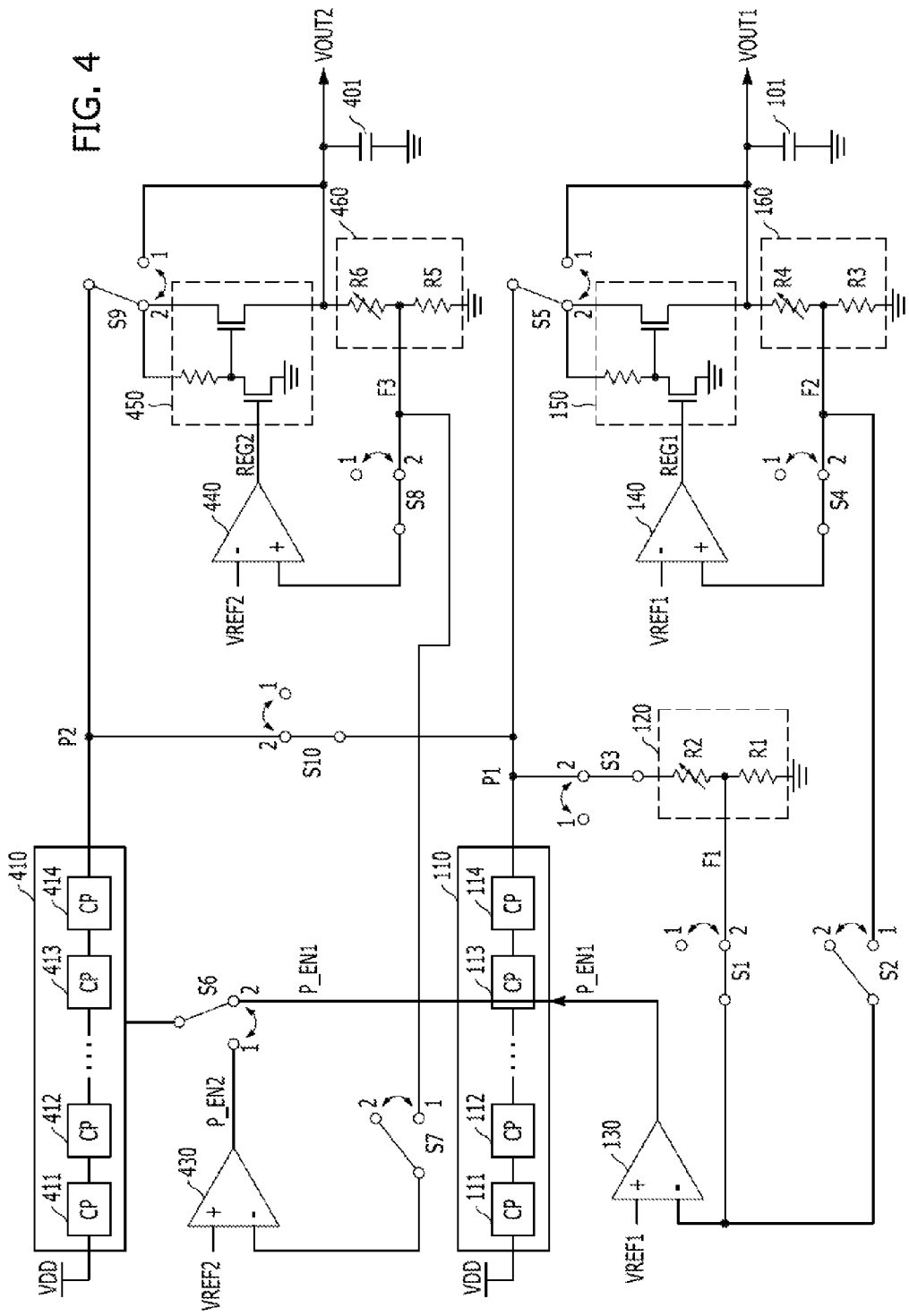
FIG. 4 is a diagram illustrating a configuration of a voltage generation circuit in accordance with another embodiment of the present invention.

FIG. 4 is a diagram illustrating a configuration of a voltage generation circuit in accordance with another embodiment of the present invention. In this embodiment, the voltage generation circuit that generates two output voltages will be described. In FIG. 4, the elements having the same reference numerals as those in FIG. 1 operate in the same manner as those shown in FIGS. 1 to 3.

Referring to FIG. 4, the voltage generation circuit includes a first pumping unit 110, a second pumping unit 410, switches S1 to S10, a first voltage division unit 120, a first activation signal generation unit 130, a first control signal generation unit 140, a first output voltage adjustment unit 150, a second voltage division unit 160, a second activation signal generation unit 430, a second control signal generation unit 440, a second output voltage adjustment unit 450, and a third voltage division unit 460.

The first pumping unit 110 includes a plurality of charge pumps 111 to 114 which are connected in series. The charge pump 111 generates an output voltage that is higher than a power supply voltage VDD, and the next charge pump 112 generates a higher output voltage than the output voltage of the charge pump 111. An output voltage of the last charge pump 114 is supplied to a first pumping terminal P1 of the pumping unit 110. The first pumping unit 110 is activated or inactivated in response to a first activation signal P_EN1.

The second pumping unit 410 is configured in a similar manner to the first pumping unit 110. The second pumping unit 410 operates in response to a second activation signal P_EN2 and the first activation signal P_EN1, in a first mode and a second mode, respectively.

The first voltage division unit 120, the first activation signal generation unit 130, the first control signal generation unit 140, the first output voltage adjustment unit 150, the second voltage division unit 160, the second activation signal generation unit 430, the second control signal generation unit 440, the second output voltage adjustment unit 450, and the third voltage division unit 460 are selectively coupled to each other to constitute a voltage regulation unit corresponding to a set mode of the voltage generation circuit.

In the first mode, the voltage regulation unit includes the first activation signal generation unit 130, the second voltage division unit 160, the second activation signal generation unit 430, and the third voltage division unit 460. The voltage regulation unit in the first mode controls the first pumping unit 110 and the second pumping unit 410 so that the first pumping unit 110 generates a first target voltage and the second pumping unit 410 generates a second target voltage, respectively. In the second mode, the voltage regulation unit includes the first voltage division unit 120, the first activation signal generation unit 130, the first control signal generation unit 140, the first output voltage adjustment unit 150, the second voltage division unit 160, the second control signal generation unit 440, the second output voltage adjustment unit 450, and the third voltage division unit 460. The voltage regulation unit in the second mode controls the first pumping unit 110 and the second pumping unit 410 so that the first pumping unit 110 and the second pumping unit 410 generate reserve voltages, which are used to generate the first target voltage and the second target voltage, respectively, through down conversion of the reserve voltages. As described above, the elements shown in FIG. 4 are selectively activated to differently implement the voltage regulation unit in accordance with the set mode based on operations of the switches S1 to S10.

In the first mode and the second mode, the voltage generation circuit operates to implement a single-regulation method and a double-regulation method, respectively. In an embodiment, the voltage generation circuit in FIG. 4 may be set to a third mode. In the third mode, a first target voltage (i.e., a voltage of a first output node VOUT1) is generated using the signal-regulation method, and a second target voltage (i.e., a voltage of a second output node VOUT2) is generated using the double-regulation method. The operations of the switches S1 to S10 are performed depending on the set mode, i.e., the first, second, or third mode. Table 2 below shows operational states of the switches S1 to S10 in accordance with the set mode.

TABLE 2

| Switch | First Mode | Second Mode | Third Mode |
| --- | --- | --- | --- |
| S1 | First State | Second State | First State |
| S2 | First State | Second State | First State |
| S3 | First State | Second State | First State |
| S4 | First State | Second State | First State |
| S5 | First State | Second State | First State |
| S6 | First State | Second State | Second State |
| S7 | First State | Second State | Second State |
| S8 | First State | Second State | Second State |
| S9 | First State | Second State | Second State |
| S10 | First State | Second State | Second State |

Hereinafter, operations of the voltage generation circuit in accordance with the three modes will be described with reference to FIGS. 5-7, respectively.

Figure 5:
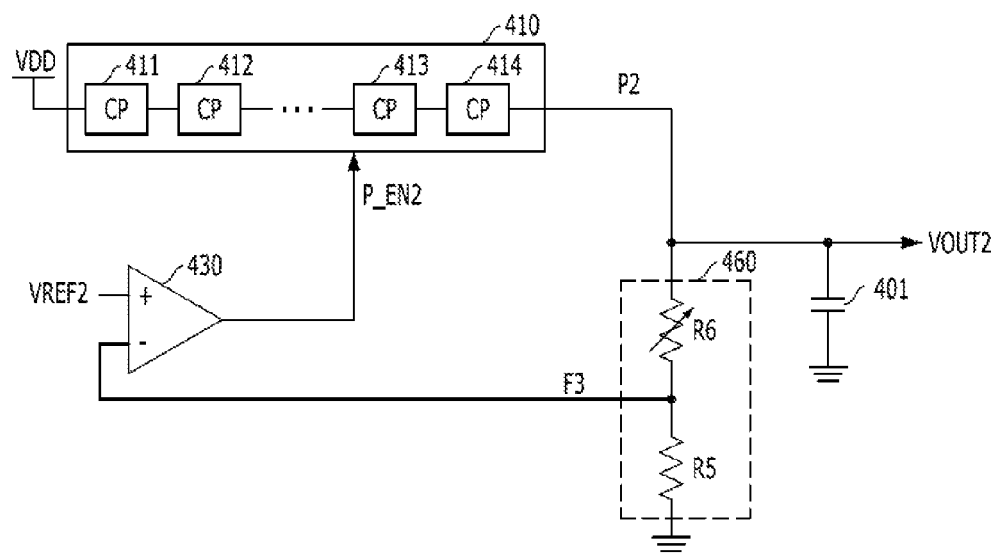
FIG. 5 is a diagram illustrating operating elements when the voltage generation circuit of FIG. 4 is set to a first mode.
Figure 5:
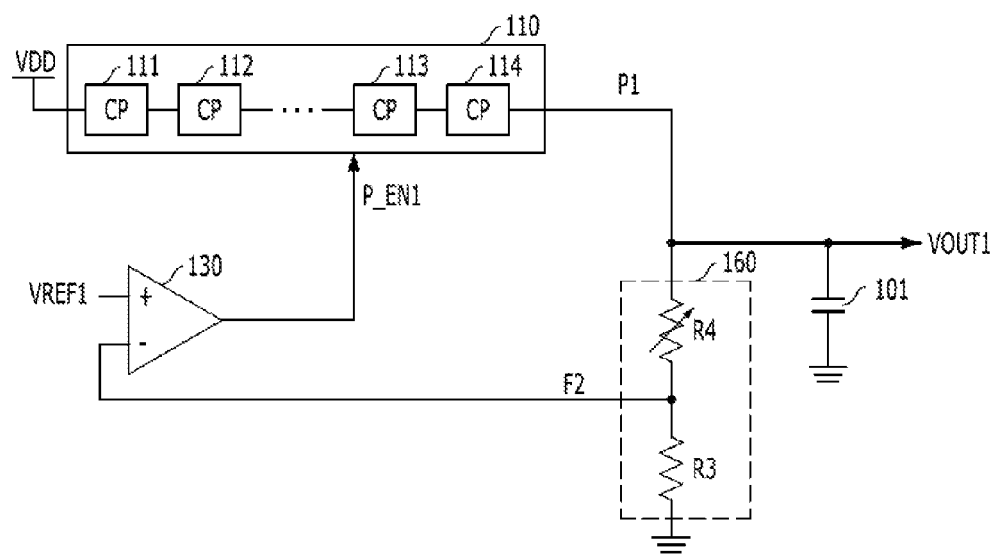

FIG. 5 is a diagram illustrating operating elements when the voltage generation circuit of FIG. 4 is set to the first mode.

Referring to FIG. 5, the first voltage division unit 120, the first control signal generation unit 140, the first output voltage adjustment unit 150, the second control signal generation unit 440, and the second output voltage adjustment unit 450 are not shown. This is because the switches S1 to S10 shown in FIG. 4 are in the first state 1 in the first mode, and thus the first voltage division unit 120, the first control signal generation unit 140, the first output voltage adjustment unit 150, the second control signal generation unit 440, and the second output voltage adjustment unit 450 do not operate. The first pumping terminal P1 and the first output node VOUT1 are directly connected to each other through the switch S5 in the first state 1. The second pumping terminal P2 and the second output node VOUT2 are also directly connected to each other through the switch S9 in the first state 1.

In the first mode, the first pumping unit 110, the second voltage division unit 160, and the first activation signal generation unit 130 operate in the same manner as the corresponding units described above with reference to FIG. 2. Accordingly, the voltage of the first output node VOUT1 becomes approximately equal to $VREF1*\{(R3+R4)/R3\}$, which is the first target voltage of the voltage generation circuit.

In the first mode, the third voltage division unit 460 generates a third feedback voltage F3 by dividing the voltage of the second output node VOUT2 using resistors R5 and R6. Then, the second activation signal generation unit 430 generates the second activation signal P_EN2 through comparison of a second reference voltage VREF2 with the third feedback voltage F3. Specifically, if the third feedback voltage F3 is lower than the second reference voltage VREF2, the second activation signal generation unit 430 outputs the second activation signal P_EN2 to activate a pumping operation of the second pumping unit 410, so that the second pumping unit 410 increases a level of the voltage of the second output node VOUT2. As a result, a level of the third feedback voltage F3 increases. On the other hand, if the third feedback voltage F3 is higher than the second reference voltage VREF2, the second activation signal generation unit 430 outputs the second activation signal P_EN2 to deactivate the pumping operation of the second pumping unit 410, so that the levels of the voltage of the second output node VOUT2 and the third feedback voltage F3 decrease. In this manner, the second activation signal generation unit 430 controls the second pumping unit 410 until the third feedback voltage F3 has substantially the same voltage level as the second reference voltage VREF2. As a result, the voltage of the second output node VOUT2 becomes approximately equal to $VREF2*\{(R5+R6)/R5\}$, which is the second target voltage of the voltage generation circuit. The level of the second target voltage can be changed by adjusting a resistance value of the variable resistor R6.

In embodiments of the present invention, the second reference voltage VREF2 and the first reference voltage VREF1 may have substantially the same voltage levels or different levels. This is because, even if the first reference voltage VREF1 has substantially the same voltage level as the second reference voltage VREF2, it is possible to generate the voltage of the first output node VOUT1 having a different voltage level from that of the voltage of the second output node VOUT2 by adjusting resistance values of the resistors R3, R4, R5, and R6.

Similar to the capacitor 101, the capacitor 401 is used to keep the level of the voltage of the second output node VOUT2 constant without voltage ripples.

Figure 6:
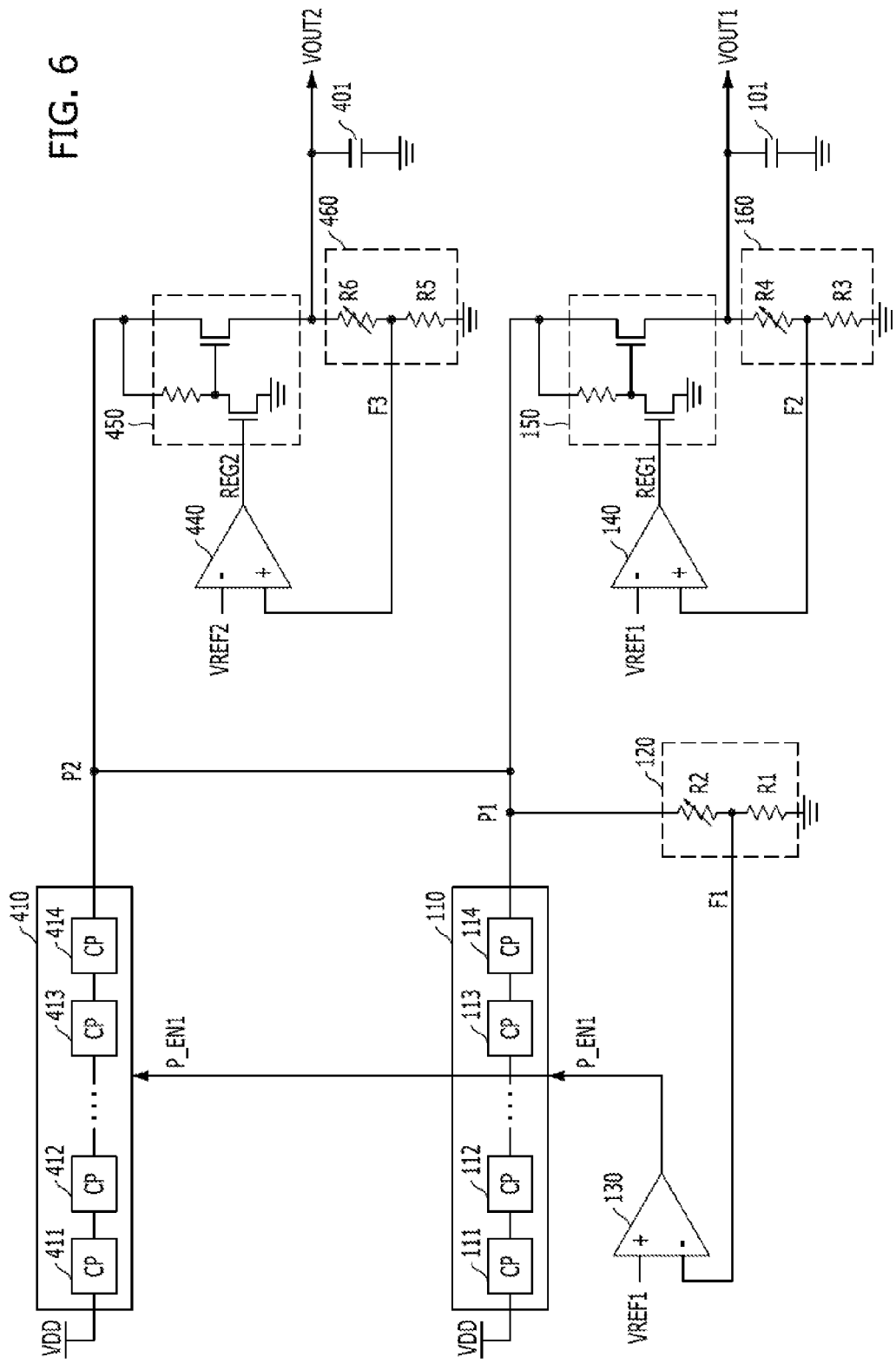
FIG. 6 is a diagram illustrating operating elements when the voltage generation circuit of FIG. 4 is set to a second mode.

FIG. 6 is a diagram illustrating operating elements when the voltage generation circuit of FIG. 4 is set to the second mode.

Referring to FIG. 6, in the second mode, since the switches S1 to S10 are in the second state 2, all the elements of the voltage generation circuit except for the second activation signal generation unit 430 operate.

In the second mode, the first pumping unit 110, the first voltage division unit 120, the second voltage division unit 160, the first activation signal generation unit 130, the first control signal generation unit 140, and the first output voltage adjustment unit 150 operate in the same manner as described above in FIG. 3. Accordingly, the voltage of the first pumping terminal P1 and the voltage of the first output node VOUT1 become approximately equal to VREF1*{(R1+R2)/R1} and VREF1*{(R3+R4)/R3}, respectively.

In the second mode, the second pumping unit 410 operates in response to the first activation signal P_EN1 in the same manner as the first pumping unit 110. Because the first pumping terminal P1 and the second pumping terminal P2 are connected to each other by the switch S10, the voltage level of the second pumping terminal P2 becomes approximately equal to that of the first pumping terminal P1, i.e., VREF1*{(R1+R2)/R1}. That is, in the second mode, the first pumping unit 110 and the second pumping unit 410 may generate voltages having substantially the same voltage level.

In the second mode, the third voltage division unit 460 generates the third feedback voltage F3 by dividing the voltage of the second output node VOUT2 using the resistors R5 and R6. The second control signal generation unit 440 generates a second control signal REG2 through comparison of the second reference voltage VREF2 with the third feedback voltage F3. In an embodiment, if the third feedback voltage F3 is lower or higher than the second reference voltage VREF2, the second control signal generation unit 440 outputs the second control signal REG2 at a "low" level or "high" level, respectively. If the second control signal REG2 is at the "low" level, the second output voltage adjustment unit 450 operates to increase the voltage of the second output node VOUT2, and thus the third feedback voltage F3 increases. On the other hand, if the second control signal REG2 is at the "high" level, the second output voltage adjustment unit 450 operates to decrease the voltage of the second output node VOUT2, and thus the third feedback voltage F3 decreases. In this manner, the second output voltage adjustment unit 450 adjusts a level of the third feedback voltage F3 until the third feedback voltage F3 becomes approximately equal to the second reference voltage VREF2. As a result, the voltage of the second output node VOUT2 becomes approximately equal to VREF2*{(R5+R6)/R5}. In this embodiment, because the voltage of the second output node VOUT2 is generated through the down conversion of the voltage of the second pumping terminal P2, the voltage of the second output node VOUT2 is smaller than the voltage of the second pumping terminal P2. Accordingly, the values of the resistors R1, R2, R5, and R6 should be determined to satisfy the condition of the voltage of the second pumping terminal P2 being higher than the voltage of the second output node VOUT2.

As described above with reference to FIGS. 5 and 6, the voltage levels of the first output node VOUT1 and the second output node VOUT2 generated in the first mode may be substantially the same as those of the first output node VOUT1 and the second output node VOUT2 generated in the second mode, respectively. This means that the voltage generation circuit may generate substantially the same levels of voltages at the first output node VOUT1 and the second output node VOUT2 regardless of whether the voltage generation circuit operates in the first mode or in the second mode.

Figure 7:
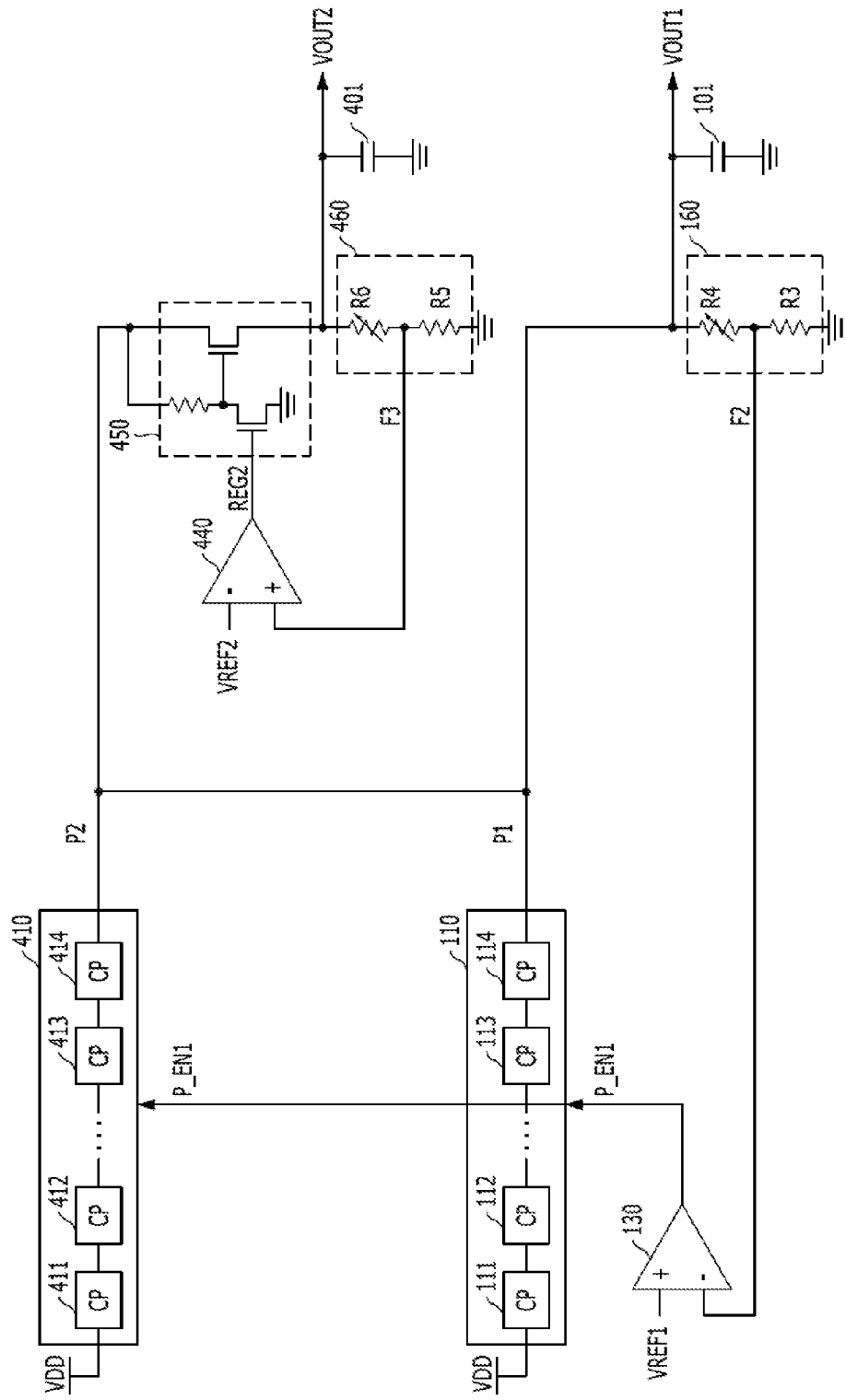
FIG. 7 is a diagram illustrating operating elements when the voltage generation circuit of FIG. 4 is set to a third mode.

FIG. 7 is a diagram illustrating operating elements when the voltage generation circuit of FIG. 4 is set to the third mode.

Referring to FIG. 7, in the third mode, the first pumping unit 110, the second voltage division unit 160, and the first activation signal generation unit 130 operate in the same manner as in the first mode described in FIG. 5. On the other hand, a first voltage division unit 120, the first control signal generation unit 140, and the first output voltage adjustment unit 150 do not operate in the third mode. Accordingly, the voltage of the first output node VOUT1 becomes approximately equal to VREF1*{(R3+R4)/R3}, which corresponds to the voltage of the first pumping terminal P1.

In the third mode, the second pumping unit 410 is controlled by the first activation signal P_EN1 because the switch S6 is in the second state 2 to connect the second pumping unit 410 and the first activation signal generation unit 130. The switches S10 and S5 are in the second state 2 and the first state 1, respectively, so that the voltage level of the second pumping terminal P2 becomes substantially the same as the voltage levels of the first pumping terminal P1 and the first output node VOUT1. That is, the voltage of the second pumping terminal P2 becomes approximately equal to VREF1*{(R3+R4)/R3}.

In the third mode, the third voltage division unit 460, the second control signal generation unit 440, and the second output voltage adjustment unit 450 operate in the same manner as the corresponding elements shown in FIG. 6, which operate in the second mode. That is, the second output voltage adjustment unit 450 performs down conversion of the voltage of the second pumping terminal P2, and thus the voltage of the second output node VOUT2 becomes approximately equal to VREF2*{(R5+R6)/R5}.

In this embodiment of the present invention, operating in the third mode, since the voltage of the first output node VOUT1 is generated using the single-regulation method, and then the voltage of the second output node VOUT2 is generated through down conversion (i.e., using the double-regulation method) of the voltage of the first output node VOUT1, the voltage of the first output node VOUT1 is higher than the voltage of the second output node VOUT2.

In the second mode and the third mode, since the switch S10 is in the second state 2, the first pumping terminal P1 and the second pumping terminal P2 are connected to each other. However, in another embodiment, the switch S10 may be in the first state 1, and thus the first pumping terminal P1 and the second pumping terminal P2 may be separately controlled.

According to an embodiment of the present invention, the voltage generation circuit may generate an output voltage using the single-regulation method or the double-regulation method according to a set mode. Accordingly, advantages of each of the two methods can be selectively utilized according to the set mode. For instance, in the first mode using the single-regulation method, the voltage generation circuit operates to reduce current consumption. In the second mode using the double-regulation method, the voltage generation circuit operates to generate a stabilized output voltage.

According to another embodiment of the present invention, the voltage generation circuit operates to generate two output voltages VOUT1 and VOUT2, and the output terminals of the different pumping units 110 and 410 are connected to each other so that the stability of the output voltages VOUT1 and VOUT2 can be improved. Particularly, in the third mode where the first and second output voltages VOUT1 and VOUT2 are generated using the single-regulation and double-regulation methods, respectively, the first output voltage VOUT1 can be stably generated by using the single-regulation method, and the second output voltage VOUT2 can be generated more stably through down conversion of the first output voltage VOUT1 because two output terminals P1 and P2 of the pumping units 110 and 410 are connected to each other.

Although various embodiments have been described for illustrative purposes, it will be apparent to those skilled in the art that various changes and modifications may be made without departing from the spirit and scope of the invention as defined in the following claims.

What is claimed is:

1. A voltage generation circuit comprising:
   a first pumping unit configured to perform a first pumping operation using a power supply voltage inputted from an external power source;
   a second pumping unit configured to perform a second pumping operation using the power supply voltage; and
   a voltage regulation unit configured to control the first and second pumping units to generate first and second pumping voltages, respectively, and configured to output the first and second pumping voltages as a first target voltage and a second target voltage, respectively, in the first mode, the voltage regulation unit configured to control the first pumping unit and the second pumping unit to generate a reserve voltage and configured to generate the first target voltage and the second target voltage by down-converting the reserve voltage in the second mode,
   wherein the voltage regulation unit selectively operates according to one of the first mode and the second mode and outputs the first and second target voltages through first and second output terminals, and
   wherein in a third mode, the voltage regulation unit is configured to control the first pumping unit and the second pumping unit to generate a third pumping voltage, output the third pumping voltage as the first target voltage, and generate the second target voltage by down-converting the third pumping voltage.

2. The voltage generation circuit of claim 1, wherein, in the third mode, the voltage regulation unit comprises:
   a first voltage division unit configured to generate a first feedback voltage by dividing the third pumping voltage generated by the first and second pumping units;
   a second voltage division unit configured to generate a second feedback voltage by dividing a voltage on the second output terminal;
   an activation signal generation unit configured to generate an activation signal by comparing the first feedback voltage with a first reference voltage;
   a control signal generation unit configured to generate a control signal by comparing the second feedback voltage with a second reference voltage; and
   an output voltage adjustment unit configured to down-convert the third pumping voltage and supply the down-converted voltage to the second output terminal as the second target voltage in response to the control signal, and
   wherein the first and second pumping units are configured to generate the third pumping voltage in response to the activation signal.

3. A voltage generation circuit comprising:
   a first pumping unit configured to perform a first pumping operation using a power supply voltage inputted from an al power source;
   a second pumping unit configured to perform a second pumping operation using the power supply voltage; and
   a voltage regulation unit configured to control the first and second pumping units to generate first and second pumping voltages, respectively, and configured to output the first and second pumping voltages as a first target voltage and a second target voltage, respectively, in the first mode, the voltage regulation unit configured to control the first pumping unit and the second pumping unit to generate a reserve voltage and configured to generate the first target voltage and the second target voltage by down-converting the reserve voltage in the second mode,
   wherein the voltage regulation unit selectively operates according to one of the first mode and the second mode and outputs the first and second target voltages through first and second output terminals, and
   wherein the voltage regulation unit comprises:
      a first voltage division unit configured to generate a first feedback voltage by dividing the reserve voltage generated by the first and second pumping units in the second mode;
      a second voltage division unit configured to generate a second feedback voltage by dividing the first pumping voltage generated by the first pumping unit in the first mode, and generate the second feedback voltage by dividing a voltage on the first output terminal in the second mode;
      a third voltage division unit configured to generate a third feedback voltage by dividing the second pumping voltage generated by the second pumping unit in the first mode, and generate the third feedback voltage by dividing a voltage on the second output terminal in the second mode;
      a first activation signal generation unit configured to generate a first activation signal by comparing the second feedback voltage with a first reference voltage in the first mode, and generate the first activation signal by comparing the first feedback voltage with the first reference voltage in the second mode;
      a second activation signal generation unit configured to generate a second activation signal by comparing the third feedback voltage with a second reference voltage in the first mode;
      a first control signal generation unit configured to generate a first control signal by comparing the second feedback voltage with the first reference voltage in the second mode;
      a second control signal generation unit configured to generate a second control signal by comparing the third feedback voltage with the second reference voltage in the second mode;
      a first output voltage adjustment unit configured to down-convert the reserve voltage generated by the first and second pumping units and supply the down-converted voltage to the first output terminal in response to the first control signal in the second mode; and
      a second output voltage adjustment unit configured to down-convert the reserve voltage generated by the first and second pumping units and supply the down-converted voltage to the second output terminal in response to the second control signal in the second mode.

4. The voltage generation circuit of claim 3, wherein the voltage regulation unit further comprises:
a plurality of switches operating to determine connection states of the units in the voltage regulation unit according to the first or second mode.

5. The voltage generation circuit of claim 3, wherein the first reference voltage and the second reference voltage have substantially the same voltage level.

6. The voltage generation circuit of claim 3, wherein in a third mode, operations of the first pumping unit, the second voltage division unit, and the first activation signal generation unit are the same as in the first mode, and
wherein in the third mode, operations of the second pumping unit, the second control signal generation unit, the third voltage division unit, and the second output voltage adjustment unit are the same as in the second mode.

7. The voltage generation circuit of claim 6, wherein in the third mode, output nodes of the first and second pumping units are connected to each other.

8. A voltage generation circuit comprising:
a first pumping unit configured to perform a first pumping operation using a power supply voltage inputted from an external power source;
a second pumping unit configured to perform a second pumping operation using the power supply voltage; and
a voltage regulation unit configured to control the first and second pumping units to generate first and second pumping voltages, respectively, and configured to output the first and second pumping voltages as a first target voltage and a second target voltage, respectively, in the first mode, the voltage regulation unit configured to control the first pumping unit and the second pumping unit to generate a reserve voltage and configured to generate the first target voltage and the second target voltage by down-converting the reserve voltage in the second mode,
wherein the voltage regulation unit selectively operates according to one of the first mode and the second mode and outputs the first and second target voltages through first and second output terminals,
wherein, in the first mode, the voltage regulation unit comprises:
a first voltage division unit configured to generate a first feedback voltage by dividing the first pumping voltage generated by the first pumping unit;
a second voltage division unit configured to generate a second feedback voltage by dividing the second pumping voltage generated by the second pumping unit;
a first activation signal generation unit configured to generate a first activation signal by comparing the first feedback voltage with a first reference voltage; and
a second activation signal generation unit configured to generate a second activation signal by comparing the second feedback voltage with a second reference voltage, and
wherein the first and second pumping units are configured to generate the first and second pumping voltages in response to the first and second activation signals, respectively.

9. A voltage generation circuit comprising:
a first pumping unit configured to perform a first pumping operation using a power supply voltage inputted from an power source;
a second pumping unit configured to perform a second pumping operation using the power supply voltage; and
a voltage regulation unit configured to control the first and second pumping units to generate first and second pumping voltages, respectively, and configured to output the first and second pumping voltages as a first target voltage and a second target voltage, respectively, in the first mode, the voltage regulation unit configured to control the first pumping unit and the second pumping unit to generate a reserve voltage and configured to generate the first target voltage and the second target voltage by down-converting the reserve voltage in the second mode,
wherein the voltage regulation unit selectively operates according to one of the first mode and the second mode and outputs the first and second target voltages through first and second output terminals,
wherein, in the second mode, the voltage regulation unit comprises:
a first voltage division unit configured to generate a first feedback voltage by dividing the reserve voltage generated by the first and second pumping units;
a second voltage division unit configured to generate a second feedback voltage by dividing a voltage on the first output terminal;
a third voltage division unit configured to generate a third feedback voltage by dividing a voltage on the second output terminal;
an activation signal generation unit configured to generate an activation signal by comparing the first feedback voltage with a first reference voltage;
a first control signal generation unit configured to generate a first control signal by comparing the second feedback voltage with the first reference voltage;
a second control signal generation unit configured to generate a second control signal by comparing the third feedback voltage with a second reference voltage;
a first output voltage adjustment unit configured to down-convert the reserve voltage and supply the down-converted voltage to the first output terminal as the first target voltage in response to the first control signal; and
a second output voltage adjustment unit configured to down-convert the reserve voltage and supply the down-converted voltage to the second output terminal as the second target voltage in response to the second control signal, and
wherein the first and second pumping units are configured to generate the reserve voltage in response to the activation signal.

* * * * *